United States Patent
Hokoi et al.

(10) Patent No.: US 9,014,900 B2
(45) Date of Patent: Apr. 21, 2015

(54) HYBRID VEHICLE

(71) Applicants: Koji Hokoi, Toyota Aichi-ken (JP);
Makoto Hirai, Toyota Aichi-ken (JP)

(72) Inventors: Koji Hokoi, Toyota Aichi-ken (JP);
Makoto Hirai, Toyota Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/220,516

(22) Filed: Mar. 20, 2014

(65) Prior Publication Data

US 2014/0288742 A1    Sep. 25, 2014

(30) Foreign Application Priority Data

Mar. 22, 2013    (JP) ................................ 2013-059780

(51) Int. Cl.
| | |
|---|---|
| B60W 20/00 | (2006.01) |
| B60W 10/06 | (2006.01) |
| B60W 10/08 | (2006.01) |
| B60W 10/26 | (2006.01) |

(52) U.S. Cl.
CPC ............... *B60W 20/40* (2013.01); *B60W 10/06* (2013.01); *B60W 10/08* (2013.01); *B60W 10/26* (2013.01); *Y10S 903/93* (2013.01)

(58) Field of Classification Search
USPC ............................ 701/22; 180/65.29; 903/903
See application file for complete search history.

(56) References Cited

U.S. PATENT DOCUMENTS

| | | | | |
|---|---|---|---|---|
| 5,832,396 A | * | 11/1998 | Moroto et al. | ................. 701/22 |
| 2001/0024104 A1 | * | 9/2001 | Suzuki | ......................... 320/104 |
| 2013/0289815 A1 | | 10/2013 | Suzuki | |

FOREIGN PATENT DOCUMENTS

| | | |
|---|---|---|
| JP | 2006-306231 A | 11/2006 |
| JP | 2009-274611 A | 11/2009 |
| JP | 2010-280250 A | 12/2010 |
| JP | 2012-147554 A | 8/2012 |

\* cited by examiner

*Primary Examiner* — Marthe Marc-Coleman
(74) *Attorney, Agent, or Firm* — Gifford, Krass, Sprinkle, Anderson & Citkowski, P.C.

(57) ABSTRACT

A hybrid vehicle includes: an engine; a motor; a battery; a navigation system; and a controller configured to carry out navigation coordination traveling, the controller being configured to stop the navigation coordination traveling when a state of charge of the battery becomes lower than or equal to a first switching threshold, the controller being configured to resume the navigation coordination traveling when the state of charge of the battery becomes higher than or equal to a second switching threshold higher than the first switching threshold, the controller being configured to set a first predetermined state of charge for the first switching threshold when there is no regenerative travel section, and the controller being configured to set a second predetermined state of charge lower than the first predetermined state of charge when there is the regenerative travel section.

9 Claims, 6 Drawing Sheets

HYBRID VEHICLE

INCORPORATION BY REFERENCE

The disclosure of Japanese Patent Application No. 2013-059780 filed on Mar. 22, 2013 including the specification, drawings and abstract is incorporated herein by reference in its entirety.

BACKGROUND OF THE INVENTION

1. Field of the Invention

The invention relates to a hybrid vehicle including an engine that is able to output driving power, a motor that is able to output driving power, a battery that is able to exchange electric power with the motor, and a navigation system that sets a travel route to a destination and carries out route guidance.

2. Description of Related Art

There has been suggested a hybrid vehicle, for example, described in Japanese Patent Application Publication No. 2010-280250 (JP 2010-280250 A). The hybrid vehicle includes an engine and a motor generator as power generating sources, a battery that exchanges electric power with the motor generator, and a navigation unit that displays a road map around a current location or searches for a route from a departure place to a destination. When the state of charge (SOC) of the battery is higher than a usage lower limit value and a required driving power value is smaller than or equal to a power threshold, an EV traveling mode is selected. In the EV traveling mode, the engine is stopped, and the vehicle is caused to travel with the use of the motor generator as a power generating source. On the other hand, when the state of charge of the battery is lower than or equal to the usage lower limit value or when the required driving power value is larger than the power threshold, an HV traveling mode is selected. In the HV traveling mode, the engine is used as the power generating source. In the hybrid vehicle, the amount of electric power usable in EV traveling (the amount of usable electric power) and an estimated value of the amount of electric power (estimated required amount of electric power) required at the time when the vehicle travels in the EV traveling mode to a destination are successively compared with each other. The power threshold is set to a low threshold when the estimated required amount of electric power is larger than the usable amount of electric power, and the power threshold is set to a high threshold when the usable amount of electric power is larger than the estimated required amount of electric power. Thus, it is possible to improve practical fuel economy.

SUMMARY OF THE INVENTION

In the hybrid vehicle, a travel plan is set by preferentially allocating an EV traveling priority mode to each of travel sections in a travel route to a destination when the destination has been set by a driver, and, basically, navigation coordination traveling is carried out. In the navigation coordination traveling, the vehicle travels in accordance with the travel plan. When the state of charge of the battery becomes lower than or equal to a first switching threshold while the vehicle is traveling in the EV traveling priority mode on the basis of the navigation coordination travel, the navigation coordination traveling is stopped. After that, when the state of charge of the battery becomes higher than or equal to a second switching threshold, which is higher than the first switching threshold, navigation coordination traveling is resumed. The thus configured hybrid vehicle is desired to extend a distance over which navigation coordination traveling is allowed to be carried out as much as possible within the travel route to the destination.

The invention provides a hybrid vehicle that extends a distance over which navigation coordination traveling in which the vehicle travels in accordance with a travel plan to a destination is allowed to be carried out.

A first aspect of the invention provides a hybrid vehicle. The hybrid vehicle includes: an engine configured to output driving power; a motor configured to output the driving power; a battery configured to exchange electric power with the motor; a navigation system configured to set a travel route to a destination and carry out route guidance, the travel route including a plurality of travel sections; a controller configured to set a travel plan for preferentially allocating an electric traveling priority mode to each of the travel sections, the electric traveling priority mode configured to carry out electric traveling in which the vehicle travels while the engine is stopped in preference to hybrid traveling in which the vehicle travels while the engine is operated, the controller configured to carry out a navigation coordination traveling in which the vehicle travels in accordance with the travel plan, the controller being configured to stop the navigation coordination traveling when a state of charge of the battery becomes lower than or equal to a first switching threshold while the vehicle is traveling in the electric traveling priority mode in accordance with the travel plan as the navigation coordination traveling, the controller being configured to resume the navigation coordination traveling when the state of charge of the battery becomes higher than or equal to a second switching threshold higher than the first switching threshold after a stop of the navigation coordination traveling, the controller being configured to set a first predetermined state of charge for the first switching threshold when there is no regenerative travel section, in which it is predicted that the motor is driven to regenerate electric power, among the travel sections ahead of the currently traveling travel section on the travel route, and the controller being configured to set a second predetermined state of charge lower than the first predetermined state of charge for the first switching threshold when there is the regenerative travel section among the travel sections ahead.

In the hybrid vehicle according to the first aspect of the invention, when the state of charge of the battery becomes lower than or equal to the first switching threshold while the vehicle is traveling in the electric traveling priority mode in accordance with the travel plan as the navigation coordination traveling, the navigation coordination traveling is stopped. After that, the navigation coordination traveling is resumed when the state of charge of the battery becomes higher than or equal to the second switching threshold higher than the first switching threshold. In addition, the first predetermined state of charge is set for the first switching threshold when there is no regenerative travel section, in which it is predicted that the motor is driven to regenerate electric power, among the travel sections ahead of the currently traveling travel section, and the second predetermined state of charge lower than the first predetermined state of charge is set for the first switching threshold when there is the regenerative travel section among the travel sections ahead. Thus, when the state of charge of the battery is likely to increase in the travel sections ahead, it is possible to suppress a stop of traveling in the electric traveling priority mode in the navigation coordination traveling. Thus, it is possible to extend the distance over which the navigation coordination traveling is carried out.

Here, preferentially allocating the electric traveling priority mode to each of the travel sections means preferentially allocating the electric traveling priority mode between two modes, that is, the electric traveling priority mode in which electric traveling is carried out in preference to hybrid traveling and the hybrid traveling priority mode in which hybrid traveling is carried out in preference to electric traveling. Specifically, the electric traveling priority mode may be allocated to a plurality of the travel sections until the total required energy of the electric traveling priority mode reaches the stored electric energy of the battery in ascending order of a traveling load of each of the travel sections. The hybrid traveling priority mode may be allocated to the remaining travel sections. In another example, the electric traveling priority mode may be allocated to a plurality of the travel sections that achieve a combination of a condition that the total required energy of the electric traveling priority mode is smaller than or equal to the stored electric energy of the battery and a condition that the distance of the electric traveling priority mode is maximum. The hybrid traveling priority mode may be allocated to the travel sections not included in the travel sections that achieve the above combination. When the navigation coordination traveling is stopped, the vehicle may be caused to travel in the hybrid traveling priority mode irrespective of the travel plan.

In the hybrid vehicle according to the first aspect of the invention, the controller may be configured to set the first predetermined state of charge for the first switching threshold when there is the regenerative travel section among the travel sections ahead and a remaining energy from the state of charge of the battery to the first predetermined state of charge is larger than a required energy that is predicted to be required for the hybrid vehicle to reach the regenerative travel section. With this configuration, it is determined that the vehicle is likely to reach the regenerative travel section before the state of charge of the battery becomes lower than or equal to the first state of charge through the navigation coordination traveling; however, when the state of charge of the battery has decreased earlier than the travel plan due to driver's accelerator operation, or the like, it is possible to suppress an excessive decrease in the state of charge of the battery.

In the hybrid vehicle according to the first aspect of the invention, when the second predetermined state of charge is set for the first switching threshold, the controller may be configured to switch the first switching threshold from the second predetermined state of charge to the first predetermined state of charge when the state of charge of the battery becomes lower than or equal to the first predetermined state of charge and then becomes higher than the first predetermined state of charge.

In addition, in the hybrid vehicle according to the first aspect of the invention, the controller may be configured to set a third predetermined state of charge for the second switching threshold when there is no regenerative travel section among the travel sections ahead while the navigation coordination traveling is stopped, and the controller may be configured to set a fourth predetermined state of charge lower than the third predetermined state of charge for the second switching threshold when there is the regenerative travel section among the travel sections ahead while the navigation coordination traveling is stopped. With this configuration, when the state of charge of the battery is likely to increase in the travel sections ahead, it is possible to quickly resume the navigation coordination traveling. In the hybrid vehicle according to the aspect of the invention, the controller may be configured to set the third predetermined state of charge for the second switching threshold when there is the regenerative travel section among the travel sections ahead while the navigation coordination traveling is stopped and when a recovered energy that is predicted to be recovered in the regenerative travel section is smaller than an energy threshold. With this configuration, it is possible to suppress an inconvenience due to a quick resumption of the electric traveling priority mode in the navigation coordination traveling (for example, the state of charge of the battery becomes lower than or equal to the first switching threshold again after the resumption, and the navigation coordination traveling is, for example, easily stopped).

A second aspect of the invention provides a hybrid vehicle. The hybrid vehicle includes: an engine configured to output driving power; a motor configured to output the driving power; a battery configured to exchange electric power with the motor; a navigation system configured to set a travel route to a destination and carry out route guidance, the travel route including a plurality of travel sections; a controller configured to set a travel plan for preferentially allocating an electric traveling priority mode to each of the travel sections, the electric traveling priority mode configured to carry out electric traveling in which the vehicle travels while the engine is stopped in preference to hybrid traveling in which the vehicle travels while the engine is operated, the controller configured to carry out navigation coordination traveling in which the vehicle travels in accordance with the travel plan, the controller being configured to stop the navigation coordination traveling when a state of charge of the battery becomes lower than or equal to a first switching threshold while the vehicle is traveling in the electric traveling priority mode in accordance with the travel plan as the navigation coordination traveling, the controller being configured to resume the navigation coordination traveling when the state of charge of the battery becomes higher than or equal to a second switching threshold higher than the first switching threshold after a stop of the navigation coordination traveling, the controller being configured to set a third predetermined state of charge for the second switching threshold when there is no regenerative travel section, in which it is predicted that the motor is driven to regenerate electric power, among the travel sections ahead of the currently traveling travel section on the travel route, and the controller being configured to set a fourth predetermined state of charge lower than the third predetermined state of charge for the second switching threshold when there is the regenerative travel section among the travel sections ahead.

In the hybrid vehicle according to the second aspect of the invention, when the state of charge of the battery becomes lower than or equal to the first switching threshold while the vehicle is traveling in the electric traveling priority mode in accordance with the travel plan as the navigation coordination traveling, the navigation coordination traveling is stopped. After that, the navigation coordination traveling is resumed when the state of charge of the battery becomes higher than or equal to the second switching threshold higher than the first switching threshold. In addition, while the navigation coordination traveling is stopped, the first predetermined state of charge is set for the second switching threshold when there is no regenerative travel section, in which it is predicted that the motor is driven to regenerate electric power, among the travel sections ahead of the currently traveling travel section, and the second predetermined state of charge lower than the first predetermined state of charge is set for the second switching threshold when there is the regenerative travel section among the travel sections ahead. With this configuration, when the state of charge of the battery is likely to increase in the travel sections ahead, it is possible to quickly resume the navigation coordination traveling. Thus, it is possible to extend the distance over which the navigation coordination traveling is carried out.

In the hybrid vehicle according to the second aspect of the invention, the controller may be configured to set the third predetermined state of charge for the second switching threshold when there is the regenerative travel section among the travel sections ahead while the navigation coordination traveling is stopped and when a recovered energy that is predicted to be recovered in the regenerative travel section is smaller than an energy threshold. With this configuration, it is possible to suppress an inconvenience due to a quick resumption of the electric traveling priority mode in the navigation coordination traveling (for example, the state of charge of the battery becomes lower than or equal to the first switching threshold again after the resumption, and the navigation coordination traveling is, for example, easily stopped).

The hybrid vehicle according to the first or second aspect of the invention may further include: a generator; and a planetary gear unit connected to a drive shaft coupled to an axle, an output shaft of the engine and a rotary shaft of the generator, and the motor may be connected to the drive shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described.

Figure 1:
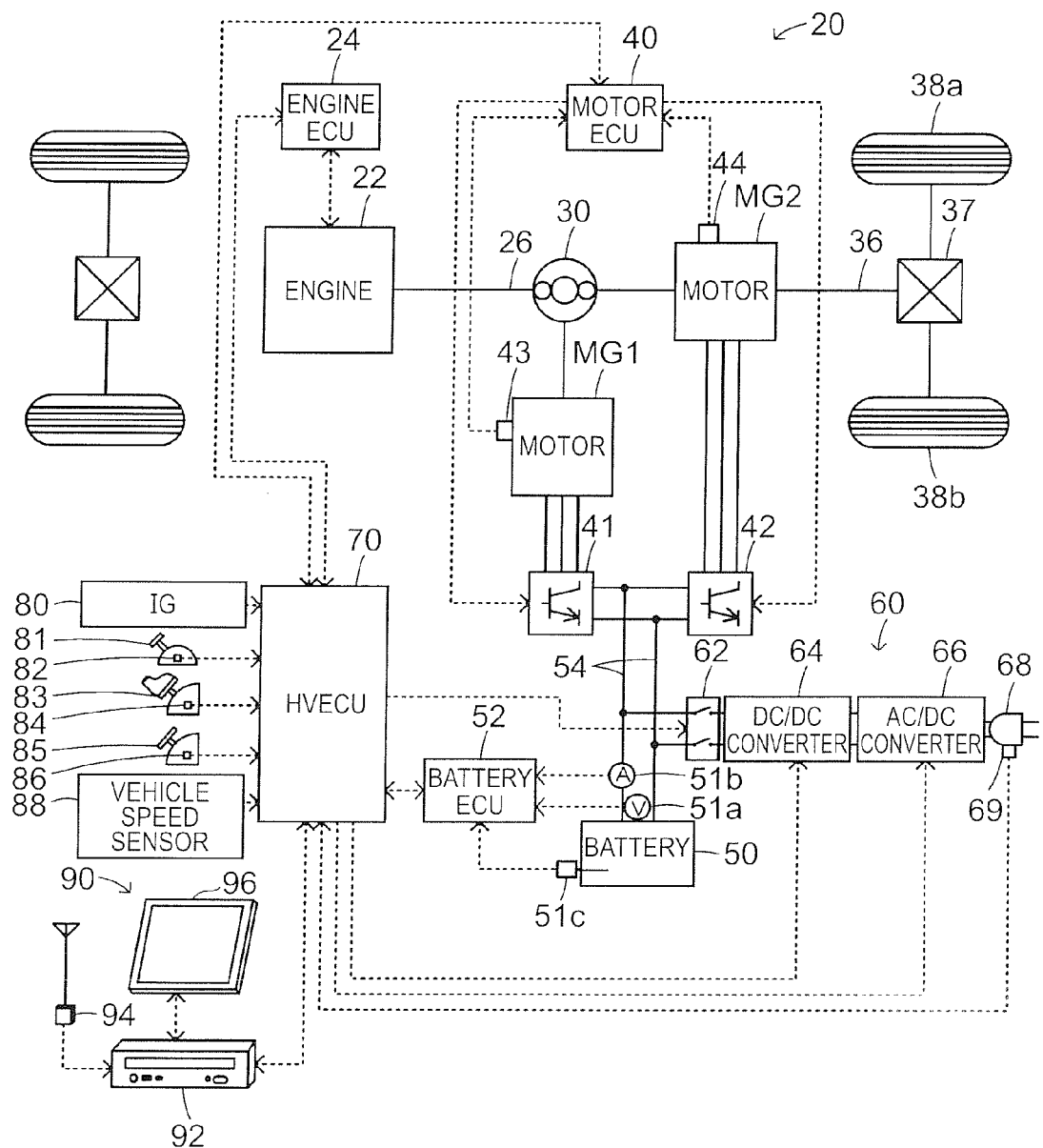
FIG. 1 is a configuration view that schematically shows the configuration of a hybrid vehicle according to an embodiment of the invention.

FIG. 1 is a configuration view that schematically shows the configuration of a hybrid vehicle 20 according to an embodiment of the invention. As shown in the drawing, the hybrid vehicle 20 according to the embodiment includes an engine 22, an engine electronic control unit (hereinafter, referred to as engine ECU) 24, a planetary gear unit 30, a motor MG1, a motor MG2, inverters 41, 42, a motor electronic control unit (hereinafter, referred to as motor ECU) 40, a battery 50, a battery electronic control unit (hereinafter, referred to as battery ECU) 52, a charger 60, a navigation system 90 and a hybrid electronic control unit (hereinafter, referred to as HVECU) 70. The engine 22 outputs power by using gasoline, light oil, or the like, as fuel. The engine ECU 24 executes drive control over the engine 22. In the planetary gear unit 30, a carrier is connected to a crankshaft 26 of the engine 22, and a ring gear is connected to a drive shaft 36 coupled to drive wheels 38a, 38b via a differential gear 37. The motor MG1 is, for example, configured as a synchronous generator motor, and a rotor of the motor MG1 is connected to a sun gear of the planetary gear unit 30. The motor MG2 is, for example, configured as a synchronous generator motor, and a rotor of the motor MG2 is connected to the drive shaft 36. The inverters 41, 42 are respectively used to drive the motors MG1, MG2. The motor ECU 40 executes drive control over the motors MG1, MG2 by executing switching control over switching elements (not shown) of the inverters 41, 42. The battery 50 is, for example, configured as a lithium ion secondary battery, and exchanges electric power with the motors MG1, MG2 via the inverters 41, 42. The battery ECU 52 manages the battery 50. The charger 60 is connected to an external power supply, such as a domestic power supply, and is able to charge the battery 50. The navigation system 90 sets a travel route and carries out route guidance when a destination is set by a driver. The HVECU 70 controls the vehicle overall.

Although not shown in the drawing, the engine ECU 24 is configured as a microprocessor mainly formed of a CPU. In addition to the CPU, the microprocessor includes a ROM that stores a processing program, a RAM that temporarily stores data, input/output ports and a communication port. Signals from various sensors that detect the operating state of the engine 22 are input to the engine ECU 24 via the input port. Examples of the signals include a crank position θcr, a coolant temperature Tw, an in-cylinder pressure Pin, a cam position θca, a throttle opening degree TH, an intake air amount Qa, an intake air temperature Ta, an air-fuel ratio AF, an oxygen signal O2, and the like. The crank position θcr is transmitted from a crank position sensor that detects the rotation position of the crankshaft 26. The coolant temperature Tw is transmitted from a coolant temperature sensor that detects the temperature of coolant of the engine 22. The in-cylinder pressure Pin is transmitted from a pressure sensor installed in a combustion chamber. The cam position θca is transmitted from a cam position sensor that detects the rotation position of a camshaft that opens or closes an intake valve for introducing air into the combustion chamber or an exhaust valve for emitting exhaust gas from the combustion chamber. The throttle opening degree TH is transmitted from a throttle valve position sensor that detects the position of a throttle valve. The intake air amount Qa is transmitted from an air flow meter installed in an intake pipe. The intake air temperature Ta is transmitted from a temperature sensor installed similarly in the intake pipe. The air-fuel ratio AF is transmitted from an air-fuel ratio sensor installed in an exhaust system. The oxygen signal O2 is transmitted from an oxygen sensor installed similarly in the exhaust system. Various control signals for driving the engine 22 are output from the engine ECU 24 via the output port. Examples of the various control signals include a drive signal to a fuel injection valve, a drive signal to a throttle motor that adjusts the position of the throttle valve, a control signal to an ignition coil integrated with an igniter, a control signal to a variable valve timing mechanism that is able to change the open/close timing of the intake valve, and the like. The engine ECU 24 communicates with the HVECU 70, executes operation control over the engine 22 in accordance with a control signal from the HVECU 70, and, where necessary, outputs data about the operating state of the engine 22 to the HVECU 70. The engine ECU 24 also computes the rotation speed of the crankshaft 26, that is, the rotation speed Ne of the engine 22, on the basis of the signal from the crank position sensor (not shown) installed on the crankshaft 26.

Although not shown in the drawing, the motor ECU 40 is configured as a microprocessor mainly formed of a CPU. In addition to the CPU, the microprocessor includes a ROM that stores a processing program, a RAM that temporarily stores data, input/output ports and a communication port. Signals required to execute drive control over the motors MG1, MG2 are input to the motor ECU 40 via the input port. Examples of the signals include rotation positions $\theta m1$, $\theta m2$ from rotation position detection sensors 43, 44 that respectively detect the rotation positions of the rotors of the motors MG1, MG2, phase currents that are fed to the motors MG1, MG2 and detected by current sensors (not shown), and the like. Switching control signals supplied to the switching elements (not shown) of the inverters 41, 42, and the like, are output from the motor ECU 40 via the output port. The motor ECU 40 communicates with the HVECU 70, executes drive control over the motors MG1, MG2 in accordance with a control signal from the HVECU 70, and, where necessary, outputs data about the operating states of the motors MG1, MG2 to the HVECU 70. The motor ECU 40 computes rotation angular velocities $\omega m1$, $\omega m2$ and rotation speeds Nm1, Nm2 of the motors MG1, MG2 on the basis of the rotation positions $\theta m1$, $\theta m2$ of the rotors of the motors MG1, MG2 from the rotation position detection sensors 43, 44.

Although not shown in the drawing, the battery ECU 52 is configured as a microprocessor mainly formed of a CPU. In addition to the CPU, the microprocessor includes a ROM that stores a processing program, a RAM that temporarily stores data, input/output ports and a communication port. Signals required to manage the battery 50 are input to the battery ECU 52. Examples of the signals include a terminal voltage Vb from a voltage sensor 51$a$ provided between the terminals of the battery 50, a charging/discharging current Ib from a current sensor 51$b$ provided in a power line connected to the output terminal of the battery 50, a battery temperature Tb from the temperature sensor 51$c$ installed on the battery 50, and the like. Where necessary, the battery ECU 52 transmits data about the state of the battery 50 to the HVECU 70 through communication. In order to manage the battery 50, the battery ECU 52 computes the state of charge SOC that is the percentage of the amount of electric power dischargeable from the battery 50 at that time with respect to the full capacity on the basis of an accumulated value of the charging/discharging current Ib detected by the current sensor 51$b$. Input/output limits Win, Wout that are allowable input/output powers at which the battery 50 may be charged or discharged are computed on the basis of the computed state of charge SOC and the battery temperature Tb. The input/output limits Win, Wout of the battery 50 can be computed by setting basic values of the input/output limits Win, Wout on the basis of the battery temperature Tb, setting an output limit correction coefficient and an input limit correction coefficient on the basis of the state of charge SOC of the battery 50, and respectively multiplying the set basic values of the input/output limits Win, Wout by the output limit correction coefficient and the input limit correction coefficient.

The charger 60 is connected via a relay 62 to a power line 54 that connects the inverters 41, 42 to the battery 50. The charger 60 includes an AC/DC converter 66 and a DC/DC converter 64. The AC/DC converter 66 converts alternating-current power, supplied from an external power supply via a power plug 68, to direct-current power. The DC/DC converter 64 converts the voltage of direct-current power from the AC/DC converter 66, and supplies the direct-current power to the power line 54.

The navigation system 90 includes a main body 92, a GPS antenna 94 and a touch panel display 96. The main body 92 incorporates a control unit that includes a storage medium, input/output ports, a communication port, and the like. The storage medium is, for example, a hard disk in which map information, and the like, are stored. The GPS antenna 94 receives information about the current location of the vehicle. The display 96 shows various pieces of information, such as information about the current location of the vehicle and a travel route to a destination, and allows an operator to input various instructions. Here, service information (for example, tourist information, a parking area, or the like), road information for each predetermined travel section (for example, a section between traffic signals, a section between intersections, or the like), and other information are stored in the map information in a database. The road information contains distance information, width information, region information (urban or suburban), category information (ordinary road, highway), gradient information, legal speed, the number of traffic signals, and the like. When a destination has been set by an operator, the navigation system 90 makes a search for a travel route from the current location of the vehicle to the destination on the basis of the map information, the current location of the vehicle and the destination. The navigation system 90 outputs the found travel route to the display 96, and carries out route guidance.

The HVECU 70 is configured as a microprocessor mainly formed of a CPU. In addition to the CPU, the microprocessor includes a ROM that stores a processing program, a RAM that temporarily stores data, a flash memory that stores and holds data, input/output ports and a communication port. A connection detection signal, an ignition signal, a shift position SP, an accelerator operation amount Acc, a brake pedal position BP, a vehicle speed V, and the like, are input to the HVECU 70 via the input port. The connection detection signal is supplied from a connection detection sensor 69 that detects connection of the power plug 68 to the external power supply. The ignition signal is supplied from an ignition switch 80. The shift position SP is supplied from a shift position sensor 82 that detects the operating position of a shift lever 81. The accelerator operation amount Acc is supplied from an accelerator pedal position sensor 84 that detects the depression amount of an accelerator pedal 83. The brake pedal position BP is supplied from a brake pedal position sensor 86 that detects the depression amount of a brake pedal 85. The vehicle speed V is supplied from a vehicle speed sensor 88. An on/off signal to the relay 62, control signals to the DC/DC converter 64 and the AC/DC converter 66, and the like, are output from the HVECU 70 via the output port. As described above, the HVECU 70 is connected to the engine ECU 24, the motor ECU 40, the battery ECU 52 and the navigation system 90 via the communication port, and exchanges various control signals and data with the engine ECU 24, the motor ECU 40, the battery ECU 52 and the navigation system 90.

The thus configured hybrid vehicle 20 according to the embodiment travels in hybrid traveling (HV traveling) in which the vehicle travels while the engine 22 is operated or travels in electric driving (EV traveling) in which the vehicle travels while the operation of the engine 22 is stopped.

While the vehicle travels in HV traveling, the HVECU 70 sets a required torque Tr* that is required for the vehicle to travel on the basis of the accelerator operation amount Acc from the accelerator pedal position sensor 84 and the vehicle speed V from the vehicle speed sensor 88. A driving power Pdrv* that is required for the vehicle to travel is calculated by multiplying the set required torque Tr* by the rotation speed Nr of the drive shaft 36 (for example, a rotation speed obtained by multiplying the rotation speed Nm2 of the motor MG2 or the vehicle speed V by a conversion coefficient). A required power Pe* that is required for the vehicle is set by subtracting a charging/discharging required power Pb* of the battery 50 (a positive value when the battery 50 is discharged) based on the state of charge SOC of the battery 50 from the calculated driving power Pdrv*. A target rotation speed Ne* and target torque Te* of the engine 22 are set by using an operation line (for example, an optimal fuel economy operation line) as the correlation between the rotation speed Ne and torque Te of the engine 22, at which it is possible to efficiently output the required power Pe* from the engine 22. A torque command Tm1* of the motor MG1 is set through rotation speed feedback control such that the rotation speed Ne of the engine 22 becomes the target rotation speed Ne* within the range of the input/output limits Win, Wout of the battery 50. In addition, a torque command Tm2* of the motor MG2 is set by subtracting a torque, which acts on the drive shaft 36 via the planetary gear unit 30 when the motor MG1 is driven at the torque command Tm1*, from the required torque Tr*. The set target rotation speed Ne* and the set target torque Te* are transmitted to the engine ECU 24. The set torque commands Tm1*, Tm2* are transmitted to the motor ECU 40. The engine ECU 24 that has received the target rotation speed Ne* and the target torque Te* executes intake air amount control, fuel injection control, ignition control, and the like, over the engine 22 such that the engine 22 is operated at the target rotation speed Ne* and the target torque Te*. The motor ECU 40 that has received the torque commands Tm1*, Tm2* executes switching control over the switching elements of the inverters 41, 42 such that the motors MG1, MG2 are respectively driven at the torque commands Tm1*, Tm2*. The vehicle travels by outputting the required torque Tr* (driving power Pdrv*) to the drive shaft 36 within the range of the input/output limits Win, Wout of the battery 50 while efficiently operating the engine 22 through such control. While the vehicle is traveling in this HV traveling, when a condition for stopping the engine 22, such as when the required power Pe* becomes lower than a start/stop threshold Pref (described later), the vehicle stops the operation of the engine 22 and travels in EV traveling.

While the vehicle is traveling in EV traveling, the HVECU 70 sets the required torque Tr* on the basis of the accelerator operation amount Acc and the vehicle speed V, sets value "0" for the torque command Tm1* of the motor MG1, and sets the torque command Tm2* of the motor MG2 such that it is possible to output the required torque Tr* to the drive shaft 36 within the range of the input/output limits Win, Wout of the battery 50. The set torque commands Tm1*, Tm2* are transmitted to the motor ECU 40. The motor ECU 40 that has received the torque commands Tm1*, Tm2* executes switching control over the switching elements of the inverters 41, 42 such that the motors MG1, MG2 are respectively driven at the torque commands Tm1*, Tm2*. The vehicle travels by outputting the required torque Tr* (driving power Pdrv*) to the drive shaft 36 within the range of the input/output limits Win, Wout of the battery 50 in a state where the operation of the engine 22 is stopped through such control. While the vehicle is traveling in this EV traveling, as well as while the vehicle is traveling in HV traveling, when a condition for starting the engine 22, such as when the calculated required power Pe* becomes higher than or equal to the start/stop threshold Pref, the vehicle starts the engine 22 and travels in HV traveling.

In the hybrid vehicle 20 according to the embodiment, when the vehicle is caused to stop its system at home or at a preset charging point, then the power plug 68 is connected to the external power supply and the connection has been detected by the connection detection sensor 69, the HVECU 70 executes external charging control. In external charging control, the HVECU 70 turns on the relay 62, and charges the battery 50 with electric power from the external power supply by controlling the DC/DC converter 64 and the AC/DC converter 66. In external charging control, the battery 50 is charged to a predetermined state of charge (for example, 80%, 85%, 90%, or the like) determined as a fully charged state or a state of charge slightly lower than the fully charged state. When the hybrid vehicle has been started up after external charging of the battery 50, unless a destination is set by a driver, the HVECU 70, the engine ECU 24 and the motor ECU 40 cause the vehicle to travel in an EV traveling priority mode in which EV traveling is carried out in preference to HV traveling until the state of charge SOC of the battery 50 becomes lower than or equal to a switching threshold Shy. After the state of charge SOC of the battery 50 becomes lower than or equal to the switching threshold Shy, the vehicle travels in an HV traveling priority mode in which HV traveling is carried out in preference to EV traveling. The switching threshold Shy is set to a value (for example, 20%, 25%, 30%, or the like) such that the state of charge SOC of the battery 50 allows starting of the engine 22.

In the embodiment, the output limit Wout of the battery 50 is set for the start/stop threshold Pref at the time of traveling in the EV traveling priority mode, and a value close to the lower limit of the required power Pe* (value sufficiently lower than the output limit Wout) at which it is possible to efficiently operate the engine 22 is set for the start/stop threshold Pref at the time of traveling in the HV traveling priority mode. Thus, the engine 22 is made hard to be started at the time of traveling in the EV traveling priority mode (the vehicle is caused to tend to travel in EV traveling). The engine 22 is made hard to be stopped at the time of traveling in the HV traveling priority mode (the vehicle is caused to tend to travel in HV traveling).

In addition, in the hybrid vehicle 20 according to the embodiment, when a destination has been set by the driver, the HVECU 70 sets a travel plan by preferentially allocating the EV traveling priority mode between the HV traveling priority mode and the EV traveling priority mode to each of a plurality of travel sections of a travel route to the destination, supplied from the navigation system 90. Specifically, the EV traveling priority mode is allocated to a plurality of the travel sections until the total required energy of the EV traveling priority mode reaches the stored electric energy of the battery 50 in ascending order of a traveling load of each of the travel sections. The HV traveling priority mode is allocated to the remaining travel sections. Thus the travel plan is set. In another example, the EV traveling priority mode is allocated to a plurality of the travel sections that achieve a combination of a condition that the total required energy of the EV traveling priority mode is smaller than or equal to the stored electric energy of the battery 50 and a condition that the distance of the EV traveling priority mode is maximum. The travel plan is set by allocating the HV traveling priority mode to the travel sections not included in the travel sections that achieve the above combination. Here, the traveling load is, for example, set so as to increase when a road surface gradient is an uphill road with respect to a traveling direction and as the gradient of the uphill increases on the basis of the map information (such as distance information and gradient information) of each travel section, supplied from the navigation system 90. The required energy of each travel section is set on the basis of an accumulated value of the traveling load in distance, the product of the average of the traveling load and the distance, or the like. In addition, the stored electric energy of the battery 50 is set as the product of the state of charge SOC of the battery 50 and the total capacity.

When the travel plan is set in this way, the HVECU 70, the engine ECU 24 and the motor ECU 40 cause the vehicle to travel in the HV traveling priority mode or the EV traveling priority mode in accordance with the travel plan. Hereinafter, such traveling is referred to as navigation coordination traveling. When the state of charge SOC of the battery 50 becomes lower than or equal to the EV-HV switching threshold Seh while the vehicle is traveling in the EV traveling priority mode in accordance with the travel plan as the navigation coordination traveling, the navigation coordination traveling is stopped, and the vehicle travels in the HV traveling priority mode irrespective of the travel plan. When the state of charge SOC of the battery 50 becomes higher than or equal to the HV-EV switching threshold She higher than the EV-HV switching threshold while the navigation coordination traveling is stopped, the vehicle resumes the navigation coordination traveling.

Figure 2:
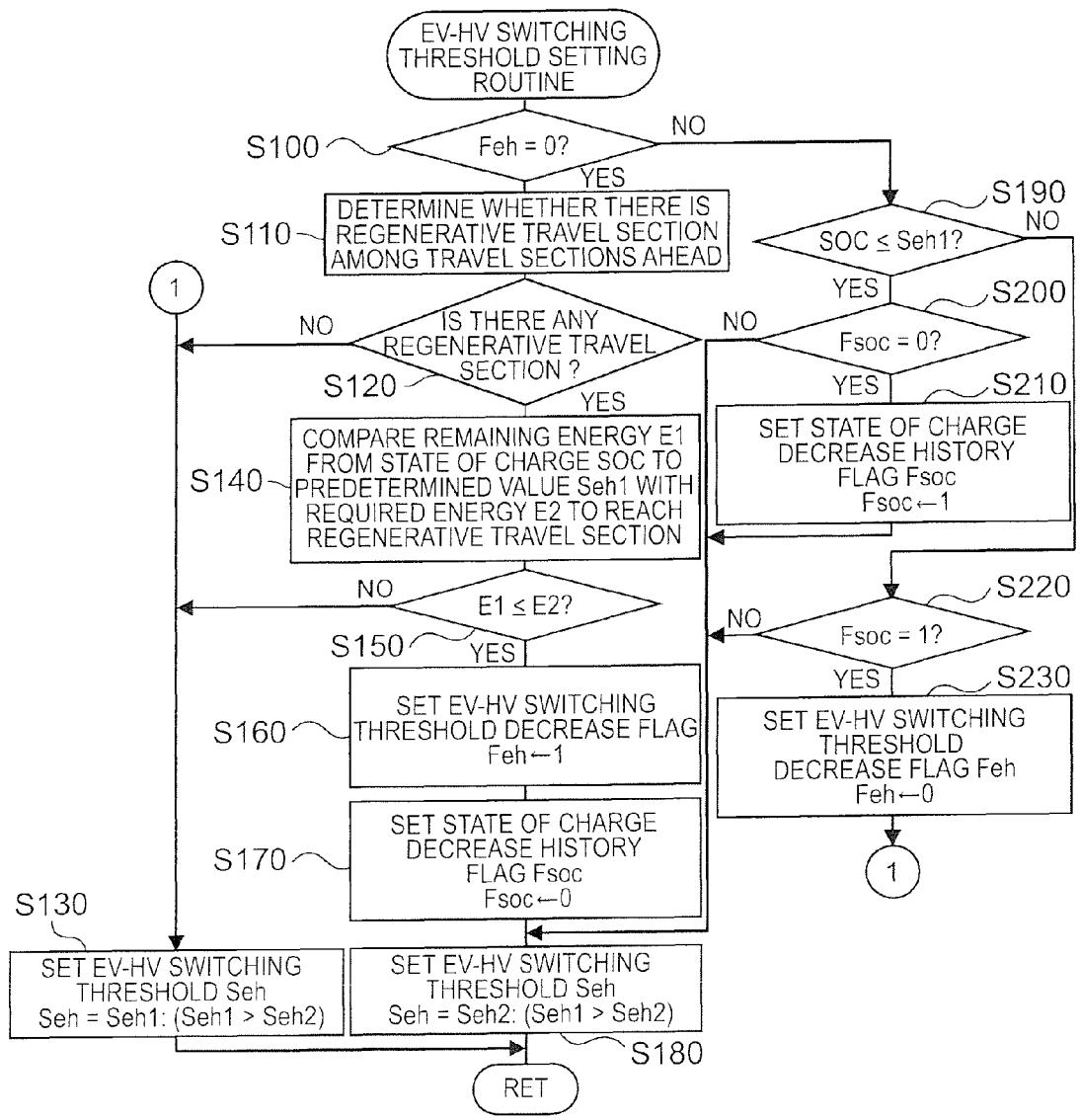
FIG. 2 is a flowchart that shows an example of an EV-HV switching threshold setting routine that is executed by an HVECU according to the embodiment.
Figure 3:
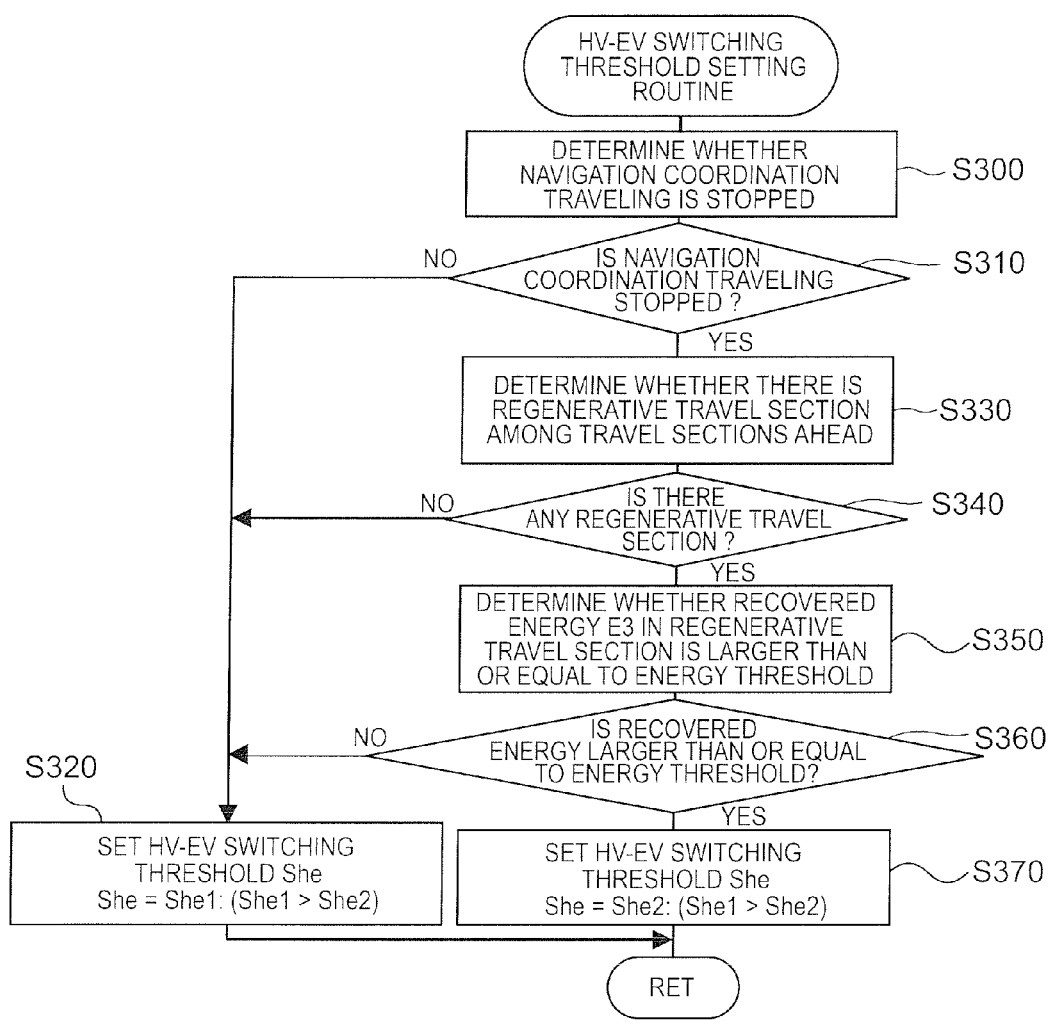
FIG. 3 is a flowchart that shows an example of an HV-EV switching threshold setting routine that is executed by the HVECU according to the embodiment.

Next, the operation of the thus configured hybrid vehicle 20 according to the embodiment and the operation at the time when the switching thresholds Seh, She are set while the vehicle is traveling in accordance with the set travel plan for the travel route to the destination will be described. FIG. 2 is a flowchart that shows an example of an EV-HV switching threshold setting routine that is executed by the HVECU 70 according to the embodiment. FIG. 3 is a flowchart that shows an example of an HV-EV switching threshold setting routine that is also executed by the HVECU 70. These routines are repeatedly executed when the vehicle is traveling (including while the navigation coordination traveling is being carried out or stopped) in accordance with the set travel plan for the travel route to the destination. In the embodiment, for the sake of easy description, it is assumed that the EV traveling priority mode is allocated to all the travel sections from the departure place (point at which the destination has been set) to the destination.

When the switching threshold setting routine is executed, the HVECU 70 according to the embodiment initially looks up the value of EV-HV switching threshold decrease flag Feh (step S100). The EV-HV switching threshold decrease flag Feh is set to value "0" when a first predetermined state of charge Seh1 (for example, 19%, 20%, 21%, or the like) is set (has been set) for the EV-HV switching threshold Seh, and is set to value "1" when a second predetermined state of charge Seh2 (for example, 16%, 17%, 18%, or the like) lower than the first predetermined state of charge Seh1 is set (has been set) for the EV-HV switching threshold Seh.

When the EV-HV switching threshold decrease flag Feh is value "0", it is determined whether there is a regenerative travel section in which it is predicted that the motor MG2 is driven to regenerate electric power (the battery 50 is charged) among the travel sections ahead of the currently traveling travel section on the basis of the map information (distance information, gradient information, and the like) of each of the travel sections of the travel route to the destination, supplied from the navigation system 90 (step S110, step S120). This determination is a process of determining whether the battery 50 is likely to be charged (the state of charge SOC of the battery 50 is likely to be recovered) in the travel sections ahead.

When there is no regenerative travel section among the travel sections ahead, it is determined that the battery 50 is not likely to be charged in the travel sections ahead, the first predetermined state of charge Seh1 is set for the EV-HV switching threshold Seh (step S130), and the routine ends. In this case, when the state of charge SOC of the battery 50 becomes lower than or equal to the EV-HV switching threshold Seh (=Seh1) while the vehicle is traveling in the EV traveling priority mode in accordance with the travel plan as the navigation coordination traveling, the navigation coordination traveling is stopped, and the vehicle travels in the HV traveling priority mode irrespective of the travel plan.

When there is a regenerative travel section among the travel sections ahead, it is determined that the battery 50 is likely to be charged in the travel sections ahead, and a remaining energy E1 from the state of charge SOC of the battery 50 to the first predetermined state of charge Seh1 or below is compared with a required energy E2 that is predicted to be required for the vehicle to reach the regenerative travel section (step 140, step S150). Here, the remaining energy E1 may be set as the product of a difference (SOC−Seh1) between the total capacity of the battery 50 and the state of charge SOC of the battery 50 and the first predetermined state of charge Seh1. The required energy E2 may be set as a value based on an accumulated value of the traveling load in distance, the product of the average of the traveling load and the distance, or the like, on the basis of the map information of each travel section. This determination is a process of determining whether the state of charge SOC of the battery 50 is likely to become lower than or equal to the threshold Seh1 before the vehicle reaches the regenerative travel section.

When the remaining energy E1 is larger than the required energy E2, it is determined that the state of charge SOC of the battery 50 is not likely to become lower than or equal to the threshold Seh1 before the vehicle reaches the regenerative travel section, the first predetermined state of charge Seh1 is set for the EV-HV switching threshold Seh (step S130), and the routine ends. In this way, it is determined that the vehicle is likely to reach the regenerative travel section before the state of charge SOC of the battery 50 becomes lower than or equal to the first predetermined state of charge Seh1 through the navigation coordination traveling, but, when the state of charge SOC of the battery 50 has quickly decreased more than the travel plan because of driver's accelerator operation, or the like, it is possible to suppress an excessively low state of charge SOC of the battery 50.

When the remaining energy E1 is smaller than or equal to the required energy E2, it is determined that the state of charge SOC of the battery 50 is likely to become lower than or equal to the threshold Seh1 before the vehicle reaches the regenerative travel section, and value "1" is set for the EV-HV switching threshold decrease flag Feh (step S160), value "0" is set for a state of charge decrease history flag Fsoc that is set to value "0" as an initial value and that is set to value "1" when the state of charge SOC of the battery 50 becomes lower than or equal to the first predetermined state of charge Seh1 (step S170), the first predetermined state of charge Seh2 is set for the EV-HV switching threshold Seh (step S180), and the routine ends. Thus, when the battery 50 is likely to be charged (the state of charge SOC of the battery 50 is likely to be recovered) in the travel sections ahead (regenerative travel section) but the state of charge SOC of the battery 50 becomes lower than or equal to the threshold Seh1 before the vehicle reaches the regenerative travel section, that is, the state of charge SOC of the battery 50 is likely to temporarily become lower than or equal to the threshold Seh1, it is possible to suppress a stop of the navigation coordination traveling.

When value "1" is set for the EV-HV switching threshold decrease flag Feh (the first predetermined state of charge Seh2 is set for the EV-HV switching threshold Seh) in this way, it is determined in step S100 that the EV-HV switching threshold decrease flag Feh is value "1" when the routine is executed next time, so the state of charge SOC of the battery 50 is compared with the first predetermined state of charge Seh1 (step S190). When the state of charge SOC of the battery 50 is lower than or equal to the first predetermined state of charge Seh1, the value of the state of charge decrease history flag Fsoc (step S210). When the state of charge decrease history flag Fsoc is value "0", it is determined that there is no history that the state of charge SOC of the battery 50 has become lower than or equal to the first predetermined state of charge Seh1, and value "1" is set for the state of charge decrease history flag Fsoc (step S200). When the state of charge decrease history flag Fsoc is value "1", it is determined that there is a history that the state of charge SOC of the battery 50 has become lower than or equal to the first predetermined state of charge Seh1, and the value of the state of charge decrease history flag Fsoc is held (the process of step S200 is not executed). The first predetermined state of charge Seh2 is set for the EV-HV switching threshold Seh (step S180), and the routine ends.

When the state of charge SOC of the battery 50 is higher than the first predetermined state of charge Seh1 in step S190, the value of the state of charge decrease history flag Fsoc is looked up (step S210). When the state of charge decrease history flag Fsoc is value "0" (step S220), it is determined that there is no history that the state of charge SOC of the battery 50 has become lower than or equal to the first predetermined state of charge Seh1, the first predetermined state of charge Seh2 is set for the EV-HV switching threshold Seh (step S180), and the routine ends. When the state of charge decrease history flag Fsoc is value "1", it is determined that there is a history that the state of charge SOC of the battery 50 has become lower than or equal to the first predetermined state of charge Seh1, value "0" is set for the EV-HV switching threshold decrease flag Feh (step S230), the first predetermined state of charge Seh1 is set for the EV-HV switching threshold Seh (step S130), and the routine ends.

The EV-HV switching threshold setting routine shown in FIG. 2 is described above. Next, the HV-EV switching threshold setting routine shown in FIG. 3 will be described. When the HV-EV switching threshold setting routine is executed, the HVECU 70 initially determines whether the navigation coordination traveling is stopped or being carried out (step S300, step S310). When the navigation coordination traveling is not stopped (is being carried out), a third predetermined state of charge She1 (for example, 28%, 30%, 32%, or the like) is set for the HV-EV switching threshold She (step S320), and the routine ends. When the navigation coordination traveling is being carried out, the HV-EV switching threshold She is not used but the HV-EV switching threshold She is set for convenience.

While the navigation coordination traveling is stopped, it is determined whether there is a regenerative travel section among the travel sections ahead of the currently traveling travel section (step S330, step S340). This determination is a similar process to the processes of step S110 and step S120 in the routine shown in FIG. 2.

When there is no regenerative travel section among the travel sections ahead, it is determined that the battery 50 is likely to be charged in the travel sections ahead, the third predetermined state of charge She1 is set for the HV-EV switching threshold She (step S320), and the routine ends. In this case, while the navigation coordination traveling is stopped and the vehicle is traveling in the HV traveling priority mode, when the state of charge SOC of the battery 50 becomes higher than or equal to the HV-EV switching threshold She (=She1), the navigation coordination traveling is resumed.

When there is a regenerative travel section among the travel sections ahead, it is determined whether a recovered energy E3 that is predicted to be recovered in the regenerative travel section is larger than or equal to an energy threshold (step S350, step S360). Here, the recovered energy E3 may be set as a value based on an accumulated value of the traveling load in distance, the product of the average of the traveling load and the distance, or the like, on the basis of the map information of each travel section. When there are a plurality of the regenerative travel sections, the total of the recovered energy in each travel section just needs to be set to the recovered energy E3 in the regenerative travel section. The energy threshold may be set to an energy by which the state of charge SOC of the battery 50 can be held in a range higher than the first predetermined state of charge Seh1 (not likely to become lower than or equal to the first predetermined state of charge Seh1) until the vehicle reaches the destination after the regenerative travel section on the basis of the map information of each travel section. This determination is a process of determining whether it is likely to be able to continue the navigation coordination traveling until the destination when the battery 50 is charged in the regenerative travel section (when the state of charge SOC of the battery 50 is recovered).

When the recovered energy E3 is larger than or equal to the energy threshold, it is determined that it is likely to be able to continue the navigation coordination traveling to the destination when the battery 50 is charged in the regenerative travel section, a fourth predetermined state of charge She2 (for example, 20%, 22%, 24%, or the like) lower than the third predetermined state of charge She1 is set for the HV-EV switching threshold She (step S370), and the routine ends. Thus, while the navigation coordination traveling is stopped, when it is likely to be able to continue the navigation coordination traveling to the destination when the battery 50 is charged in the regenerative travel section, it is possible to quickly resume the navigation coordination traveling.

When the recovered energy E3 is smaller than the energy threshold, it is determined that it is not likely to be able to continue the navigation coordination traveling to the destination even when the battery 50 is charged in the regenerative travel section, the third predetermined state of charge She1 is set for the HV-EV switching threshold She (step S320), and the routine ends. Thus, it is possible to suppress an inconvenience due to a quick resumption of the EV traveling priority mode in the navigation coordination traveling (for example, the state of charge SOC of the battery 50 becomes lower than or equal to the EV-HV switching threshold Seh again after the resumption, and the navigation coordination traveling is, for example, easily stopped).

Figure 4:
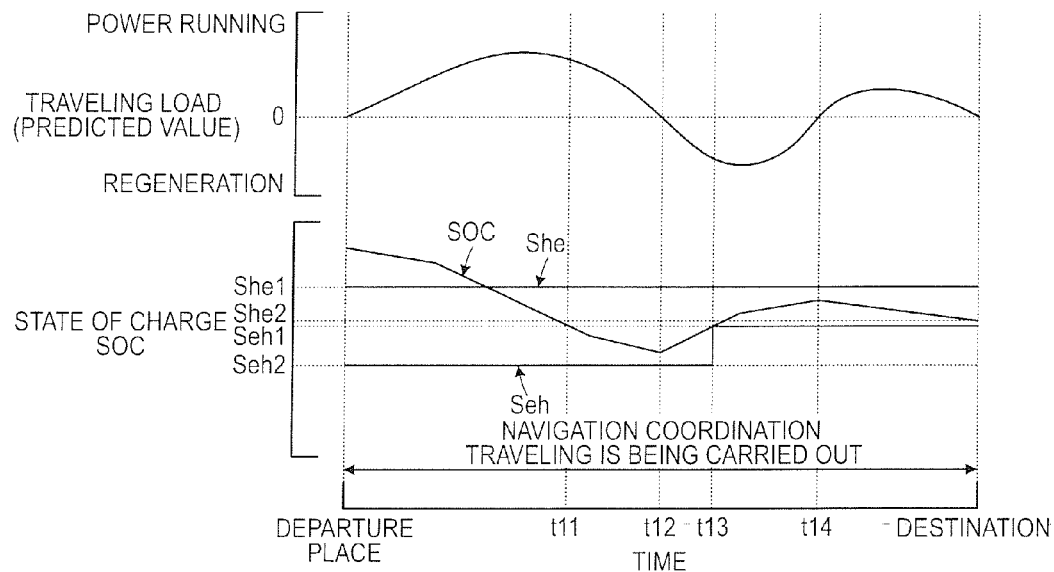
FIG. 4 is a graph that illustrates an example of a temporal variation in a traveling load (predicted value based on map information) at the time of traveling from a departure place to a destination and temporal variations in the state of charge of a battery, an EV-HV switching threshold and an HV-EV switching threshold.
Figure 5:
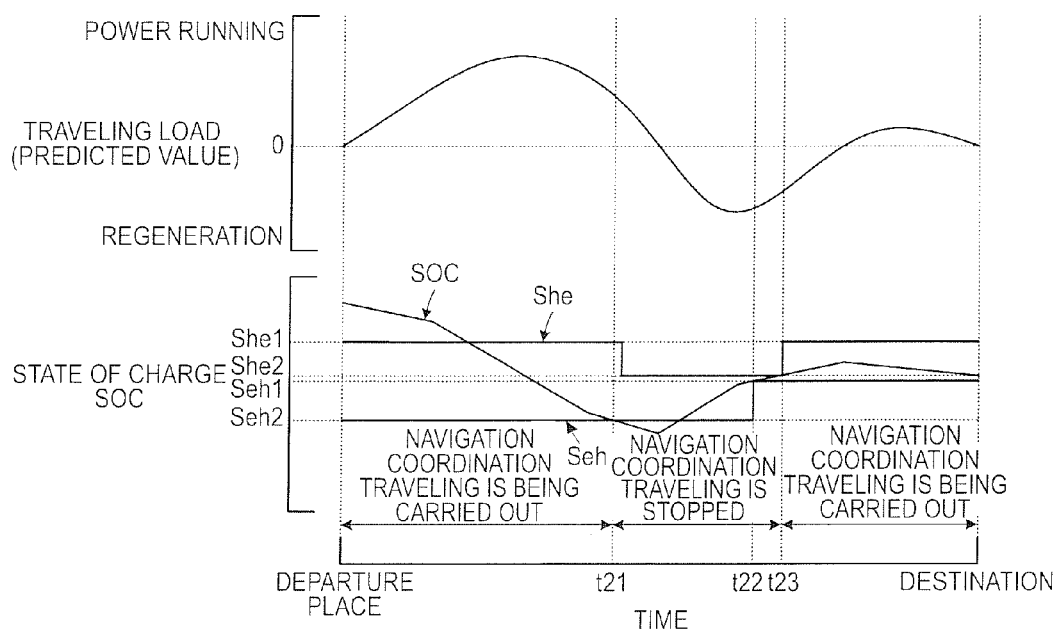
FIG. 5 is a graph that illustrates an example of a temporal variation in a traveling load (predicted value based on map information) at the time of traveling from a departure place to a destination and temporal variations in the state of charge of the battery, the EV-HV switching threshold and the HV-EV switching threshold.

FIG. 4 and FIG. 5 are graphs that show examples of a temporal variation in a traveling load (predicted value based on the map information) at the time of traveling from a departure place to a destination and temporal variations in the state of charge SOC of the battery 50, the EV-HV switching threshold Seh and the HV-EV switching threshold She. FIG. 4 and FIG. 5 assume that the EV traveling priority mode is allocated to all the travel sections from the departure place to the destination. FIG. 4 shows a state when the navigation coordination traveling is carried out from the departure place to the destination. FIG. 5 shows a state when the navigation coordination traveling is stopped on the way from the departure place to the destination.

In FIG. 4, when the vehicle starts traveling from the departure place (when the vehicle executes the routine shown in FIG. 2 for the first time), it is determined that there is a regenerative travel section among the travel sections ahead and the remaining energy E1 becomes smaller than or equal to the required energy E2, and the first predetermined state of charge Seh2 lower than the first predetermined state of charge Seh1 is set for the EV-HV switching threshold Seh. Thus, it is possible to suppress a stop of the navigation coordination traveling when the state of charge SOC of the battery 50 becomes lower than or equal to the first predetermined state of charge Seh1 (time t11) during traveling. After that, when the vehicle reaches the regenerative travel section (time t12) and the state of charge SOC of the battery 50 increases through regenerative driving of the motor MG2 to become higher than the first predetermined state of charge Seh1 (time t13), the EV-HV switching threshold Seh is switched from the first predetermined state of charge Seh2 to the first predetermined state of charge Seh1. After that, there is a regenerative travel section among the travel sections ahead (the regenerative travel section continues); however, it is determined that the remaining energy E1 is larger than the required energy E2(time t13 to time t14) or it is determined that there is no regenerative travel section among the travel sections ahead (time t14 to the destination), and the first predetermined state of charge Seh1 is set for the EV-HV switching threshold Seh. Setting the first predetermined state of charge Seh1 for the EV-HV switching threshold Seh, for example, when there is no regenerative travel section among the travel sections ahead is to further reliably protect the battery 50 when recovery of the state of charge SOC is not expected. In FIG. 4, the HV-EV switching threshold She is not used.

In FIG. 5, when the vehicle starts traveling from the departure place, as in the case of FIG. 4, it is determined that there is a regenerative travel section among the travel sections ahead and the remaining energy E1 becomes smaller than or equal to the required energy E2, and the first predetermined state of charge Seh2 lower than the first predetermined state of charge Seh1 is set for the EV-HV switching threshold Seh. When the state of charge SOC of the battery 50 becomes lower than or equal to the first predetermined state of charge Seh1 and further becomes lower than or equal to the first predetermined state of charge Seh2 (time t21), the navigation coordination traveling is stopped. The navigation coordination traveling is stopped in this way, and it is determined that there is a regenerative travel section among the travel sections ahead and the recovered energy E3 in the regenerative travel section is larger than or equal to the energy threshold, the HV-EV switching threshold She is switched from the third predetermined state of charge She1 to the fourth predetermined state of charge She2. After that, when the state of charge SOC of the battery 50 increases through regenerative driving of the motor MG2 to become higher than the first predetermined state of charge Seh1 (time t22), as in the case of FIG. 4, the EV-HV switching threshold Seh is switched from the first predetermined state of charge Seh2 to the first predetermined state of charge Seh1. Furthermore, when the state of charge SOC increases to become higher than or equal to the fourth predetermined state of charge She2 (time t23), the navigation coordination traveling is resumed, and the HV-EV switching threshold She is switched from the fourth predetermined state of charge She2 to the third predetermined state of charge She1.

When the state of charge SOC of the battery 50 becomes lower than or equal to the EV-HV switching threshold Seh while the vehicle is traveling in the EV traveling priority mode in accordance with the travel plan as the navigation coordination traveling, the above-described hybrid vehicle 20 according to the embodiment stops the navigation coordination traveling and travels in the HV traveling priority mode, and, after that, resumes the navigation coordination traveling when the state of charge SOC of the battery 50 becomes higher than or equal to the HV-EV switching threshold She. In the hybrid vehicle, the first predetermined state of charge Seh1 is set for the EV-HV switching threshold Seh when there is no regenerative travel section among the travel sections ahead; whereas the first predetermined state of charge Seh2 lower than the first predetermined state of charge Seh1 is set for the EV-HV switching threshold Seh when there is a regenerative travel section among the travel sections ahead. Thus, when the state of charge SOC of the battery 50 is likely to increase in the travel sections ahead, it is possible to suppress a stop of traveling in the EV traveling priority mode in the navigation coordination traveling. Thus, it is possible to extend the distance over which the navigation coordination traveling is carried out. Even when there is a regenerative travel section among the travel sections ahead, but when the remaining energy E1 from the state of charge SOC of the battery 50 to the first predetermined state of charge Seh1 or below is larger than the required energy E2 that is predicted to be required for the vehicle to reach the regenerative travel section, the first predetermined state of charge Seh1 is set for the EV-HV switching threshold Seh. Thus, it is determined that the vehicle is likely to reach the regenerative travel section before the state of charge SOC of the battery 50 becomes lower than or equal to the first predetermined state of charge Seh1 through the navigation coordination traveling; however, when the state of charge SOC of the battery 50 has decreased earlier than the travel plan due to driver's accelerator operation, or the like, it is possible to suppress an excessive decrease in the state of charge SOC of the battery 50.

With the hybrid vehicle 20 according to the embodiment, when there is no regenerative travel section among the travel sections ahead while the navigation coordination traveling is stopped, the third predetermined state of charge She1 is set for the HV-EV switching threshold She; whereas, when there is a regenerative travel section among the travel sections ahead while the navigation coordination traveling is stopped, the fourth predetermined state of charge She2 lower than the third predetermined state of charge She1 is set for the HV-EV switching threshold She. Thus, when the state of charge SOC of the battery 50 is likely to increase in the travel sections ahead, it is possible to quickly resume traveling of the vehicle in the EV traveling priority mode in the navigation coordination traveling. Thus, it is possible to extend the distance over which the navigation coordination traveling is carried out. Even when there is a regenerative travel section among the travel sections ahead, but when the recovered energy E3 that is predicted to be recovered in the regenerative travel section is smaller than the energy threshold, the third predetermined state of charge She1 is set for the HV-EV switching threshold She. Thus, it is possible to suppress an inconvenience due to a quick resumption of the EV traveling priority mode in the navigation coordination traveling. The inconvenience is, for example, that the state of charge SOC of the battery 50 becomes lower than or equal to the EV-HV switching threshold Seh again after the resumption and then the navigation coordination traveling is easily stopped.

The hybrid vehicle 20 according to the embodiment executes control for setting one of the EV-HV switching threshold Seh and the HV-EV switching threshold She (switching between the EV-HV switching threshold Seh and the HV-EV switching threshold She) on the basis of the condition, such as whether there is a regenerative travel section among the travel sections ahead. Instead, the hybrid vehicle 20 may execute control such that one of the EV-HV switching threshold Seh and the HV-EV switching threshold She is set (the EV-HV switching threshold Seh and the HV-EV switching threshold She are switched) on the basis of the condition and the other one is set to a fixed value.

In the case where the hybrid vehicle 20 according to the embodiment sets the EV-HV switching threshold Seh, when there is a regenerative travel section among the travel sections ahead, the first predetermined state of charge Seh1 is set for the EV-HV switching threshold Seh when the remaining energy E1 is larger than the required energy E2; whereas the first predetermined state of charge Seh2 is set for the EV-HV switching threshold Seh when the remaining energy E1 is smaller than or equal to the required energy E2. Instead, when there is a regenerative travel section among the travel sections ahead, the first predetermined state of charge Seh2 may be set for the EV-HV switching threshold Seh irrespective of which one of the remaining energy E1 and the required energy E2 is larger.

In the case where the hybrid vehicle 20 according to the embodiment sets the EV-HV switching threshold Seh, when the first predetermined state of charge Seh2 has been set for the EV-HV switching threshold Seh, the EV-HV switching threshold Seh is switched from the first predetermined state of charge Seh2 to the first predetermined state of charge Seh1 when the state of charge SOC of the battery 50 becomes lower than or equal to the first predetermined state of charge Seh1 and then becomes higher than the first predetermined state of charge Seh1. Instead, the EV-HV switching threshold Seh may be switched from the first predetermined state of charge Seh2 to the first predetermined state of charge Seh1, for example, when there is no regenerative travel section among the travel sections ahead any more (when the vehicle has finished traveling the regenerative travel section), or when the state of charge SOC of the battery 50 becomes lower than or equal to the first predetermined state of charge Seh1 and then becomes higher than the first predetermined state of charge Seh1 and, in addition, there is no regenerative travel section among the travel sections ahead any more.

In the case where the hybrid vehicle 20 according to the embodiment sets the HV-EV switching threshold She, when there is a regenerative travel section among the travel sections ahead, the third predetermined state of charge She1 is set for the HV-EV switching threshold She when the recovered energy E3 is smaller than the energy threshold; whereas the fourth predetermined state of charge She2 is set for the HV-EV switching threshold She when the recovered energy E3 is larger than or equal to the energy threshold. Instead, the fourth predetermined state of charge She2 may be set for the HV-EV switching threshold She irrespective of the recovered energy E3.

Figure 6:
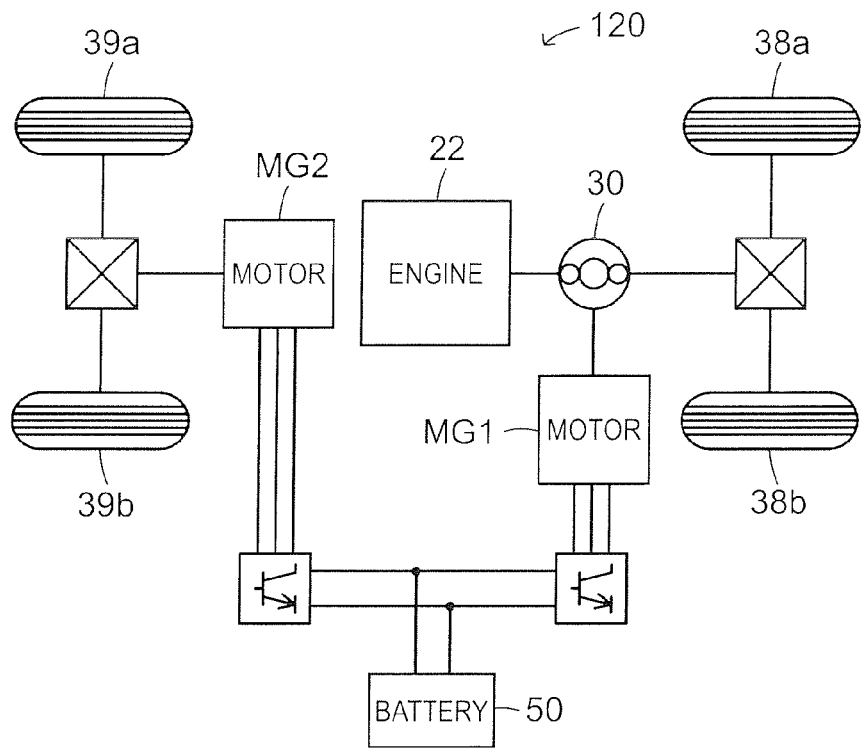
FIG. 6 is a configuration view that schematically shows the configuration of a hybrid vehicle according to an alternative embodiment.

In the hybrid vehicle 20 according to the embodiment, power from the motor MG2 is output to the drive shaft 36 connected to the drive wheels 38a, 38b. Instead, as illustrated in a hybrid vehicle 120 according to an alternative embodiment shown in FIG. 6, power from the motor MG2 may be output to an axle (axle connected to wheels 39a, 39b in FIG. 6) different from an axle connected to the drive wheels 38a, 38b) to which the drive shaft 36 is connected.

Figure 7:
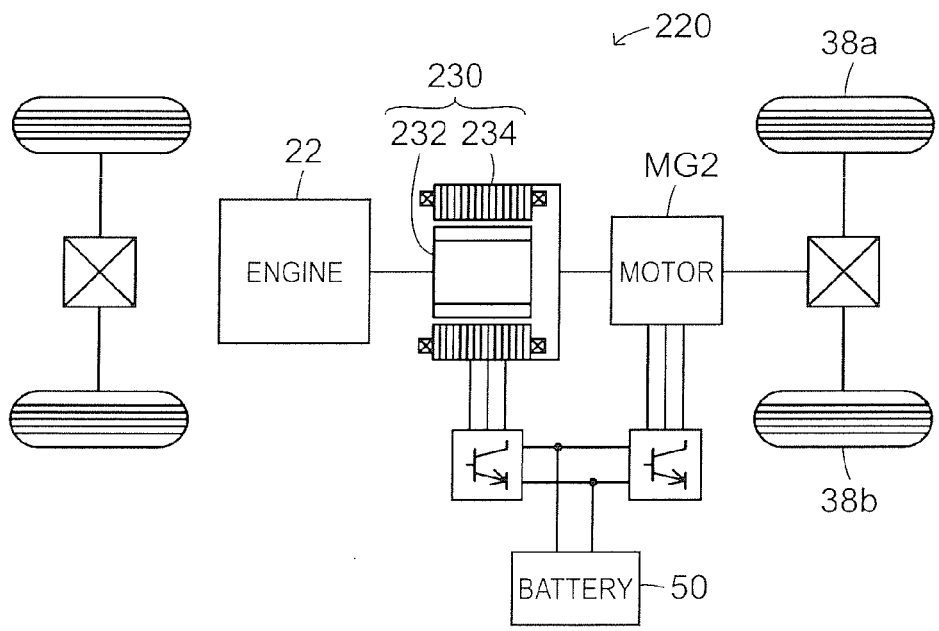
FIG. 7 is a configuration view that schematically shows the configuration of a hybrid vehicle according to an alternative embodiment.

In the hybrid vehicle 20 according to the embodiment, power from the engine 22 is output to the drive shaft 36 connected to the drive wheels 38a, 38b via the planetary gear unit 30. Instead, as illustrated in a hybrid vehicle 220 according to an alternative embodiment shown in FIG. 7, a twin rotor motor 230 may be provided. The twin rotor motor 230 includes an inner rotor 232 connected to the crankshaft of the engine 22 and an outer rotor 234 connected to the drive shaft 36 connected to the drive wheels 38a, 38b, transmits part of power from the engine 22 to the drive shaft 36 and converts the remaining power to electric power.

Figure 8:
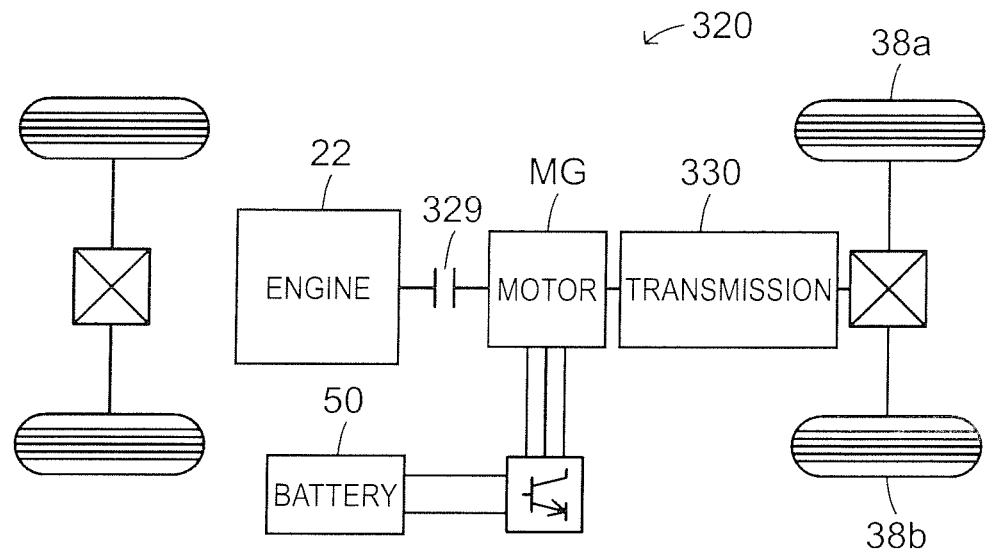
FIG. 8 is a configuration view that schematically shows the configuration of a hybrid vehicle according to an alternative embodiment.
Figure 9:
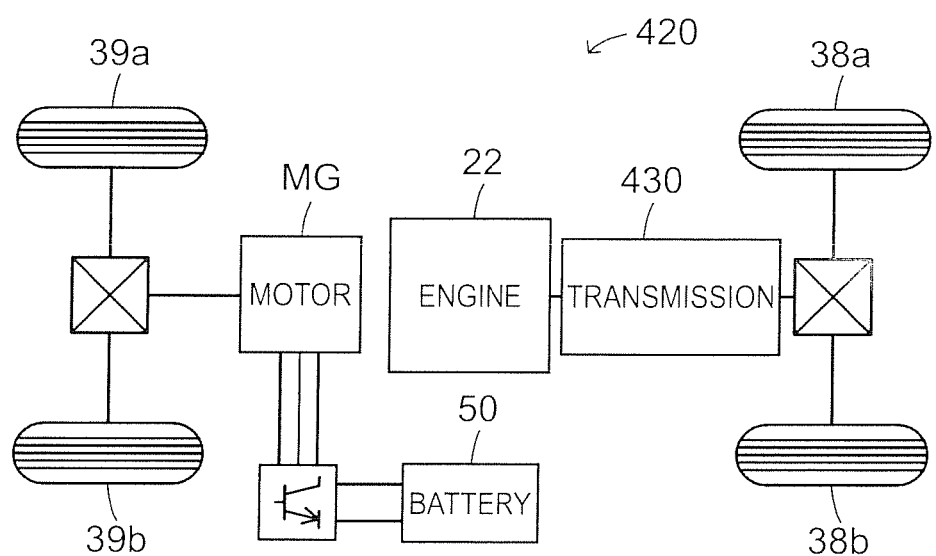
FIG. 9 is a configuration view that schematically shows the configuration of a hybrid vehicle according to an alternative embodiment.

In the hybrid vehicle 20 according to the embodiment, power from the engine 22 is output via the planetary gear unit 30 to the drive shaft 36 connected to the drive wheels 38a, 38b, and power from the motor MG2 is output to the drive shaft 36. Instead, as illustrated in a hybrid vehicle 320 according to an alternative embodiment shown in FIG. 8, a motor MG may be connected via a transmission 330 to the drive shaft 36 connected to the drive wheels 38a, 38b, the engine 22 may be connected to the rotary shaft of the motor MG via a clutch 329, power from the engine 22 may be output to the drive shaft 36 via the rotary shaft of the motor MG and the transmission 330, and power from the motor MG may be output to the drive shaft via the transmission 330. Alternatively, as illustrated in a hybrid vehicle 420 according to an alternative embodiment shown in FIG. 9, power from the engine 22 may be output via a transmission 430 to the drive shaft 36 connected to the drive wheels 38a, 38b, and power from the motor MG may be output to an axle (axle connected to the wheels 39a, 39b shown in FIG. 9) different from an axle connected to the drive wheels 38a, 38b.

The correspondence relationship between the major elements according to the embodiment and the major elements of the invention described in Summary of the Invention will be described. In the relationship between the embodiment and the first and second hybrid vehicles according to the invention, which correspond to the embodiment, commonly, the engine 22 corresponds to the "engine", the motor MG2 corresponds to the "motor", the battery 50 corresponds to the "battery", the navigation system 90 corresponds to the "navigation system", the HVECU 70 that sets a travel plan by preferentially allocating the EV traveling priority mode between the HV traveling priority mode and the EV traveling priority mode to each of travel sections of a travel route to a destination, supplied from the navigation system 90, when the destination has been set by the driver corresponds to the "controller".

In the relationship between the embodiment and the first hybrid vehicle according to the invention, in the configuration that the navigation coordination traveling in which the vehicle travels in accordance with the travel plan is carried out, the navigation coordination traveling is stopped and the vehicle travels in the HV traveling priority mode when the state of charge SOC of the battery 50 becomes lower than or equal to the EV-HV switching threshold Seh while the vehicle is traveling in the EV traveling priority mode in accordance with the travel plan as the navigation coordination traveling and, after that, the navigation coordination traveling is resumed when the state of charge SOC of the battery 50 becomes higher than or equal to the HV-EV switching threshold She, the HVECU 70, the engine ECU 24 and the motor ECU 40 that set the first predetermined state of charge Seh1 for the EV-HV switching threshold Seh when there is no regenerative travel section among the travel sections ahead and set the first predetermined state of charge Seh2 lower than the first predetermined state of charge Seh1 for the EV-HV switching threshold Seh when there is a regenerative travel section among the travel sections ahead correspond to the "controller".

In the relationship between the embodiment and the second hybrid vehicle according to the invention, in the configuration that the navigation coordination traveling in which the vehicle travels in accordance with the travel plan is carried out, the navigation coordination traveling is stopped and the vehicle travels in the HV traveling priority mode when the state of charge SOC of the battery 50 becomes lower than or equal to the EV-HV switching threshold Seh while the vehicle is traveling in the EV traveling priority mode in accordance with the travel plan as the navigation coordination traveling and, after that, the navigation coordination traveling is resumed when the state of charge SOC of the battery 50 becomes higher than or equal to the HV-EV switching threshold She, the HVECU 70, the engine ECU 24 and the motor ECU 40 set the third predetermined state of charge She1 for the HV-EV switching threshold She when there is no regenerative travel section among the travel sections ahead while the navigation coordination traveling is stopped and set the fourth predetermined state of charge She2 lower than the third predetermined state of charge She1 for the HV-EV switching threshold She when there is a regenerative travel section among the travel sections ahead while the navigation coordination traveling is stopped correspond to the "controller".

Here, the "engine" in the first and second hybrid vehicles according to the invention is not limited to the engine 22 that outputs power using gasoline, light oil, or the like, as fuel, and may be an engine of any type as long as the engine is able to output driving power. The "motor" is not limited to the motor MG2 configured as the synchronous generator motor, and may be a motor of any type, such as an induction motor, as long as the motor is able to output driving power. The "battery" is not limited to the battery 50 configured as a lithium ion secondary battery, and may be a battery of any type, such as a nickel-metal hydride secondary battery and a nickel-cadmium secondary battery, as long as the battery is able to exchange electric power with the motor. The "navigation system" is not limited to the navigation system 90, and may be configured as a navigation system of any type as long as the navigation system sets a travel route to a destination and carries out route guidance. The "controller" is not limited to the one that sets the travel plan by preferentially allocating the EV traveling priority mode between the HV traveling priority mode and the EV traveling priority mode to each of the travel sections of the travel route to a destination, supplied from the navigation system 90, when the destination has been set by the driver, and may be a controller of any type as long as the controller sets a travel plan by preferentially allocating the EV traveling priority mode, in which electric traveling in which the vehicle travels while the operation of the engine is stopped is carried out in preference to hybrid traveling in which the vehicle travels while the engine is operated, to each of the travel sections of the travel route to the destination, supplied from the navigation system. The "controller" is not limited to the one that is configured as a combination of the HVECU 70, the engine ECU 24 and the motor ECU 40, and may be configured as a single electronic control unit.

The "controller" in the first hybrid vehicle according to the invention is not limited to the one that sets the first predetermined state of charge Seh1 for the EV-HV switching threshold Seh when there is no regenerative travel section among the travel sections ahead and sets the first predetermined state of charge Seh2 lower than the first predetermined state of charge Seh1 for the EV-HV switching threshold Seh when there is a regenerative travel section among the travel sections ahead in the configuration that the navigation coordination traveling in which the vehicle travels in accordance with the travel plan is carried out, the navigation coordination traveling is stopped and the vehicle travels in the HV traveling priority mode when the state of charge SOC of the battery 50 becomes lower than or equal to the EV-HV switching threshold Seh while the vehicle is traveling in the EV traveling priority mode in accordance with the travel plan as the navigation coordination traveling and, after that, the navigation coordination traveling is resumed when the state of charge SOC of the battery 50 becomes higher than or equal to the HV-EV switching threshold She. The "controller" may be configured as any type as long as the "controller" carries out the navigation coordination traveling in which the vehicle travels in accordance with the travel plan, stops the navigation coordination traveling when the state of charge of the battery becomes lower than or equal to a first switching threshold while the vehicle is traveling in the EV traveling priority mode in accordance with the travel plan as the navigation coordination traveling and, after that, resumes the navigation coordination traveling when the state of charge of the battery becomes higher than or equal to a second switching threshold higher than the first switching threshold, sets a first predetermined state of charge for the first switching threshold when there is no regenerative travel section, in which it is predicted that the motor is driven to regenerate electric power, among the travel sections ahead of the currently traveling travel section, and sets a second predetermined state of charge lower than the first predetermined state of charge for the first switching threshold when there is the regenerative travel section among the travel sections ahead.

The "controller" in the second hybrid vehicle according to the invention is not limited to the one that sets the third predetermined state of charge She1 for the HV-EV switching threshold She when there is no regenerative travel section among the travel sections ahead while the navigation coordination traveling is stopped and sets the fourth predetermined state of charge She2 lower than the third predetermined state of charge She1 for the HV-EV switching threshold She when there is the regenerative travel section among the travel sections ahead in the configuration that the navigation coordination traveling in which the vehicle travels in accordance with the travel plan is carried out, the navigation coordination traveling is stopped and the vehicle travels in the HV traveling priority mode when the state of charge SOC of the battery 50 becomes lower than or equal to the EV-HV switching threshold Seh while the vehicle is traveling in the EV traveling priority mode in accordance with the travel plan as the navigation coordination traveling and, after that, resumes the navigation coordination traveling when the state of charge SOC of the battery 50 becomes higher than or equal to the HV-EV switching threshold She. The "controller" may be configured as any type as long as the "controller" carries out the navigation coordination traveling in which the vehicle travels in accordance with the travel plan, stops the navigation coordination traveling when the state of charge of the battery becomes lower than or equal to the first switching threshold while the vehicle is traveling in the EV traveling priority mode in accordance with the travel plan as the navigation coordination traveling, after that, resumes the navigation coordination traveling when the state of charge of the battery becomes higher than or equal to the second switching threshold higher than the first switching threshold, sets the third predetermined state of charge for the second switching threshold when there is no regenerative travel section, in which it is predicted that the motor is driven to regenerate electric power, among the travel sections ahead of the currently traveling travel section while the navigation coordination traveling is stopped, and sets the fourth predetermined state of charge lower than the third predetermined state of charge for the second switching threshold when there is the regenerative travel section among the travel sections ahead.

The correspondence relationship between the major elements according to the embodiment and the major elements of the invention described in Summary of the Invention does not limit the elements of the invention described in Summary of the Invention because the embodiment is one example for specifically explaining the embodiment of the invention described in Summary of the Invention. That is, the invention described in Summary of the Invention should be construed on the basis of the description in that section, and the embodiment is only one specific example of the invention described in Summary of the Invention.

The mode for carrying out the invention is described using the embodiment; however, the invention is not limited to the above embodiment, and, of course, various modifications are applicable without departing from the scope of the invention.

The invention is usable in, for example, manufacturing industries for a hybrid vehicle.

What is claimed is:

1. A hybrid vehicle comprising:
an engine configured to output driving power;
a motor configured to output the driving power;
a battery configured to exchange electric power with the motor;
a navigation system configured to set a travel route to a destination and carry out route guidance, the travel route including a plurality of travel sections; and
a controller configured to set a travel plan for preferentially allocating an electric traveling priority mode to each of the travel sections, the electric traveling priority mode configured to carry out electric traveling in which the vehicle travels while the engine is stopped in preference to hybrid traveling in which the vehicle travels while the engine is operated, the controller configured to carry out a navigation coordination traveling in which the vehicle travels in accordance with the travel plan, the controller being configured to stop the navigation coordination traveling when a state of charge of the battery becomes lower than or equal to a first switching threshold while the vehicle is traveling in the electric traveling priority mode in accordance with the travel plan as the navigation coordination traveling, the controller being configured to resume the navigation coordination traveling when the state of charge of the battery becomes higher than or equal to a second switching threshold higher than the first switching threshold after a stop of the navigation coordination traveling, the controller being configured to set a first predetermined state of charge for the first switching threshold when there is no regenerative travel section, in which it is predicted that the motor is driven to regenerate electric power, among the travel sections ahead of the currently traveling travel section on the travel route, and the controller being configured to set a second predetermined state of charge lower than the first predetermined state of charge for the first switching threshold when there is the regenerative travel section among the travel sections ahead.

2. The hybrid vehicle according to claim 1, wherein
the controller is configured to set the first predetermined state of charge for the first switching threshold when there is the regenerative travel section among the travel sections ahead and a remaining energy from the state of charge of the battery to the first predetermined state of charge is larger than a required energy that is predicted to be required for the hybrid vehicle to reach the regenerative travel section.

3. The hybrid vehicle according to claim 1, wherein
when the second predetermined state of charge is set for the first switching threshold, the controller is configured to switch the first switching threshold from the second predetermined state of charge to the first predetermined state of charge when the state of charge of the battery becomes lower than or equal to the first predetermined state of charge and then becomes higher than the first predetermined state of charge.

4. The hybrid vehicle according to claim 1, wherein
the controller is configured to set a third predetermined state of charge for the second switching threshold when there is no regenerative travel section among the travel sections ahead while the navigation coordination traveling is stopped, and the controller is configured to set a fourth predetermined state of charge lower than the third predetermined state of charge for the second switching threshold when there is the regenerative travel section among the travel sections ahead while the navigation coordination traveling is stopped.

5. The hybrid vehicle according to claim 4, wherein
the controller is configured to set the third predetermined state of charge for the second switching threshold when there is the regenerative travel section among the travel sections ahead while the navigation coordination traveling is stopped and when a recovered energy that is predicted to be recovered in the regenerative travel section is smaller than an energy threshold.

6. The hybrid vehicle according to claim 1, further comprising:
a generator; and
a planetary gear unit connected to a drive shaft coupled to an axle, an output shaft of the engine and a rotary shaft of the generator, wherein
the motor is connected to the drive shaft.

7. A hybrid vehicle comprising:
an engine configured to output driving power;
a motor configured to output the driving power;
a battery configured to exchange electric power with the motor;
a navigation system configured to set a travel route to a destination and carry out route guidance, the travel route including a plurality of travel sections; and
a controller configured to set a travel plan for preferentially allocating an electric traveling priority mode to each of the travel sections, the electric traveling priority mode configured to carry out electric traveling in which the vehicle travels while the engine is stopped in preference to hybrid traveling in which the vehicle travels while the engine is operated, the controller configured to carry out navigation coordination traveling in which the vehicle travels in accordance with the travel plan, the controller being configured to stop the navigation coordination traveling when a state of charge of the battery becomes lower than or equal to a first switching threshold while the vehicle is traveling in the electric traveling priority mode in accordance with the travel plan as the navigation coordination traveling, the controller being configured to resume the navigation coordination traveling when the state of charge of the battery becomes higher than or equal to a second switching threshold higher than the first switching threshold after a stop of the navigation coordination traveling, the controller being configured to set a third predetermined state of charge for the second switching threshold when there is no regenerative travel section, in which it is predicted that the motor is driven to regenerate electric power, among the travel sections ahead of the currently traveling travel section on the travel route, and the controller being configured to set a fourth predetermined state of charge lower than the third predetermined state of charge for the second switching threshold when there is the regenerative travel section among the travel sections ahead.

8. The hybrid vehicle according to claim 7, wherein
the controller is configured to set the third predetermined state of charge for the second switching threshold when there is the regenerative travel section among the travel sections ahead while the navigation coordination traveling is stopped and when a recovered energy that is predicted to be recovered in the regenerative travel section is smaller than an energy threshold.

9. The hybrid vehicle according to claim 7, further comprising:
   a generator; and
   a planetary gear unit connected to a drive shaft coupled to an axle, an output shaft of the engine and a rotary shaft of the generator, wherein
   the motor is connected to the drive shaft.

\* \* \* \* \*

UNITED STATES PATENT AND TRADEMARK OFFICE
CERTIFICATE OF CORRECTION

PATENT NO.        : 9,014,900 B2                          Page 1 of 1
APPLICATION NO.   : 14/220516
DATED             : April 21, 2015
INVENTOR(S)       : Koji Hokoi and Makoto Hirai It is certified that error appears in the above-identified patent and that said Letters Patent is hereby corrected as shown below:

Specification

In Column 13, Line 15, delete "Fsoc (step S210)" and insert --Fsoc is looked up (step S200)--, therefor.

In Column 13, Line 20, delete "Fsoc (step S200)" and insert --Fsoc (step S210)--, therefor.

Signed and Sealed this
Twenty-third Day of February, 2016

Michelle K. Lee
*Director of the United States Patent and Trademark Office*